(12) United States Patent
Bouchard et al.

(10) Patent No.: US 6,334,124 B1
(45) Date of Patent: Dec. 25, 2001

(54) TECHNIQUES FOR IMPROVING INDEX SEARCHES IN A CLIENT-SERVER ENVIRONMENT

(75) Inventors: Eugene E. Bouchard, Pleasanton; Venkat R. Sriram, Cupertino; Scott E. Stanelle, San Jose; Varma S. Kunaparaju, Sunnyvale, all of CA (US)

(73) Assignee: Ventro Corporation, Mountain View, CA (US)

( * ) Notice: Subject to any disclaimer, the term of this patent is extended or adjusted under 35 U.S.C. 154(b) by 0 days.

(21) Appl. No.: 09/164,946

(22) Filed: Oct. 1, 1998

Related U.S. Application Data (60) Provisional application No. 60/061,198, filed on Oct. 6, 1997, provisional application No. 60/061,129, filed on Oct. 6, 1997, provisional application No. 60/061,299, filed on Oct. 6, 1997, provisional application No. 60/061,214, filed on Oct. 6, 1997, provisional application No. 60/061,552, filed on Oct. 6, 1997, and provisional application No. 60/062,542, filed on Oct. 6, 1997.

(51) Int. Cl.[7] ............................. G06F 13/00; G06F 17/30
(52) U.S. Cl. ................. 707/3; 707/10; 709/203; 709/218
(58) Field of Search ..................... 707/3, 10, 102, 707/1; 709/203, 218

(56) References Cited

U.S. PATENT DOCUMENTS

| 5,381,332 | 1/1995 | Wood ........................................ 705/8 |
| 5,548,506 | 8/1996 | Srinivasan ................................ 705/8 |
| 5,706,452 | 1/1998 | Ivanov ................................. 345/751 |
| 5,806,065 | * 9/1998 | Lomet ....................................... 707/8 |
| 5,809,502 | * 9/1998 | Burrows ..................................... 707/7 |
| 5,920,856 | * 7/1999 | Syeda-Mahmood ...................... 707/3 |
| 6,049,799 | * 4/2000 | Mangat et al. .......................... 707/10 |
| 6,101,491 | * 8/2000 | Woods ..................................... 707/3 |
| 6,173,287 | * 1/2001 | Eberman et al. ...................... 707/102 |
| 6,219,671 | * 4/2001 | De Vries et al. ..................... 707/102 |
| 6,243,708 | * 6/2001 | De Vries et al. ..................... 707/102 |

* cited by examiner

Primary Examiner—Kenneth R. Coulter
(74) Attorney, Agent, or Firm—Beyer Weaver & Thomas, LLP (57) ABSTRACT

A computer implemented system and method for facilitating index searching by a client computer through records of a datastore. The datastore is accessible by a server computer of the client-server computer network. The method includes creating client indices of the records. The client indices are in a format accessible by the client computer. The method also includes transmitting the indices to the client computer and storing the client indices locally at the client computer. The method further includes employing the client indices for the index searching by the client computer to produce a list of records that satisfies a search query associated with the index searching. Furthermore, creating the client indices includes transmitting a command from the client computer to the server computer to instruct the server computer to create the client indices. Such transmission includes encapsulating the command that instructs the server computer to create the client indices in a payload of a data packet chosen to have a protocol that can traverse to a security firewall between the client computer and the server computer so that the data packet can be transmitted unimpeded from the client computer to the server computer through the security firewall.

8 Claims, 7 Drawing Sheets

| |
|---|
| OPEN_NOTEBOOK |
| GET_UNIQUE_IDENTIFIER |
| PUBLISH |
| UPLOAD |
| LOCK_ENTRY |
| CONFERENCE_CONTROL |
| UPDATE_FULL_INDEX |
| REBUILD_INDEX |
| UPDATE_LINK_INDEX |
| UPDATE_KEYWORD_INDEX |
| UPDATE_SUBJECT_INDEX |
| ⋮ |

TECHNIQUES FOR IMPROVING INDEX SEARCHES IN A CLIENT-SERVER ENVIRONMENT

This application claims priority under 35 U.S.C 119 (e) of the U.S. provisional applications listed below, all of which are incorporated by reference herein.

"Object Oriented HTML" filed Oct. 6, 1997 by inventors Eugene E. Bouchard, Varma Kunaparaju, Venkat R. Sriram, and Scott E. Stanelle (U.S. application Ser. No. 60/061,198)

"Keyword Searching" filed Oct. 6, 1997 by inventors Eugene E. Bouchard, Varma Kunaparaju, Venkat R. Sriram, Scott E. Stanelle, and Wallace W. Yau (U.S. application Ser. No. 60/061,129)

"Protocol Packet" filed Oct. 6, 1997 by inventors Eugene E. Bouchard, Varma Kunaparaju, Venkat R. Sriram, and Scott E. Stanelle (U.S. application Ser. No. 60/061,299)

"Overall MECE Design" filed Oct. 6, 1997 by inventor Eugene E. Bouchard (U.S. application Ser. No. 60/061,214)

"Internet Caching" filed Oct. 6, 1997 by inventor Eugene E. Bouchard (U.S. application Ser. No. 60/061,552)

"Link Searching" filed Oct. 6, 1997 by inventor Eugene E. Bouchard (U.S. application Ser. No. 60/062,542).

BACKGROUND OF THE INVENTION

The present invention relates to techniques for accessing databases in a computer network. More particularly, the present invention relates to improved techniques for permitting users of a client-server computer network to more efficiently access data in data repositories that are stored at the server computer.

In modern computer networks, there is often a need to work with large repositories of data. A typical data repository may contain thousands, millions, or even billions of records, each of which may contain any type of type of data (e.g., text, graphics, audio/video clips, typed data such as links among records, or any combination of computer-readable data). Note that the term "record" is employed herein in its general sense and represents, like its pre-computer counterpart, any collection of data that may be stored and tracked as a unit. Depending on the need of a particular software application program, a record may as simple as a data structure for storing a single numerical value or may be as complex as any data structure that is computer-readable. An exemplary record, known as trackpoint, may be found in a commonly owned, co-pending U.S. patent application Ser. No. 09/164,947, filed Oct. 1, 1998, now U.S. Pat. No. 6,212,549 and PCT/US98/20771 filed Oct. 1, 1998, both entitled "Trackpoint-Based Computer-Implemented Systems And Methods For Facilitating Collaborative Project Development And Communication," filed by inventors Eugene E. Bouchard, Varma Kunaparaju, Venkat R. Sriram, and Scott E. Stanelle and incorporated herein by reference.

Figure 1:
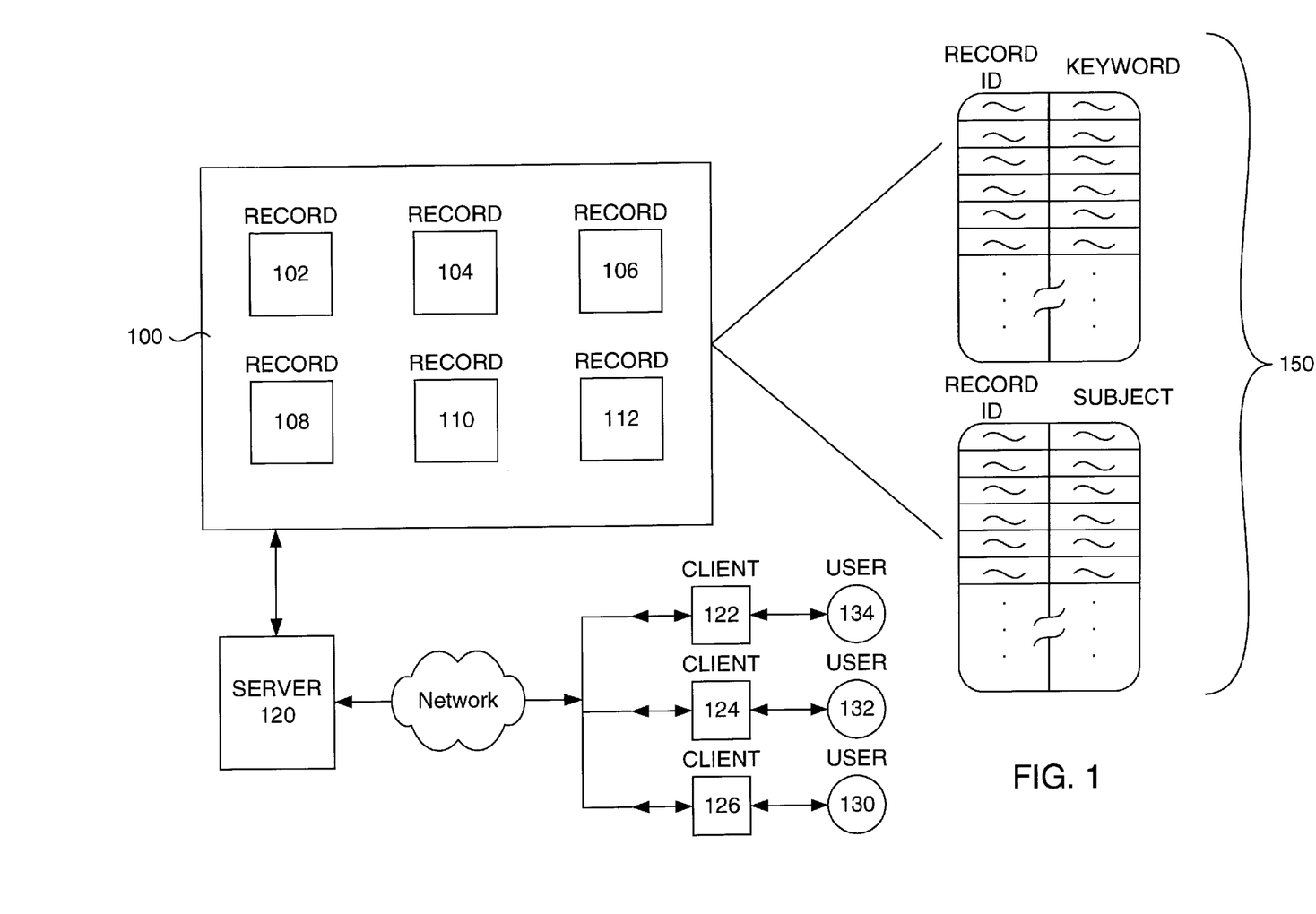
FIG. 1 illustrates a typical prior art arrangement for conducting index searches in a computer network.

To facilitate discussion, FIG. 1 illustrates, in a simplified manner, a data repository 100, which is shown to include six records 102, 104, 106, 108, 110, and 112. For the purposes of the example of FIG. 1, data repository 100 may represent a database for storing records of data pertaining to a project being developed collaboratively by many people, such as an automobile development project. To simplify the discussion, each of records 102–112 stores only text. As mentioned earlier, however, a record may include any combination of computer-readable data, and a typical data repository in reality may have any number of records.

Due to the size of the typical data repository, it is usually impractical to provide a copy of data repository 100 at each computer or terminal wishing to access the data repository. Accordingly, data repository 100 is typically associated with and accessible by a server computer 120, which is typically a fast computer endowed with sufficient processing, storage, cache, and I/O resources for working with a large data repository. Server computer 120 is connected to multiple client computers 122, 124, and 126 through some type of conventional computer network technology, which may be a network proprietary to a particular enterprise, a virtual private network (VPN) over a public network, or the public network itself (e.g., the internet). Although only one server computer and three client computers are depicted in FIG. 1 to simplify the discussion, a typical computer network may include any number of server computers and client computers.

Through the client computers 122, 124, and 126 and server computer 120, project participants (e.g., those indicated by reference numbers 130, 132, and 134) collaborating on a project may conduct a variety of operations vis-a-vis the data repository, including storing new data into data repository 100, modifying existing data in the records of data repository 100, and/or searching the records to obtain data that is of interest to a user. There are many ways with which a user may search for data contained in the records of data repository 100. By way of example, a user may wish to perform a full search through the content of the records to find the record or records that contain the data sought. As an example, a technician wishing to obtain the technical specification of piston rings may use a client computer to communicate with server computer 120 that he wishes to search for records that contain the term "piston ring" in their content.

A full search through a data repository is, however, a time consuming and inefficient way to find information. This is because a full search often turns up many "false hits," since it returns all records that satisfy the search criteria although many of records found may only mention the specified search term (e.g., "piston ring") in passing and may have little or no relevance to the user. The user may then have to look through the large number of records referenced by the search result to weed out irrelevant records until he finds the information needed.

To permit the user to find information more efficiently, indices that cross-reference search keys with unique record IDs may be employed. The user may search the indices to find the identity of the records that contain the information he needs. By way of example the metadata of a record, which comprises data fields characterizing the record, may be employed as search keys. The metadata themselves are typically supplied by the creator of a record to assist others in finding the record being created. Alternatively, the metadata may be computer-generated from the content of an existing record. One search key may represent, for example, keywords indicative of key concepts of a record. Another search key may represent, for example, the subject of the record.

Indices can be created for databases implementing any database implemented in accordance with any database technology, including file-based repositories, relational database management systems (RDMS), object database management systems (ODMS), or any record/file keeping technology. Since the indices is a relatively small database compared to the server data repository and the process of index building itself already filters out marginal records that may have little relevance to the search keys being indexed, index searching is a more efficient way to find information.

Using the automobile development project to facilitate discussion, the records of data repository 100 may contain data, deadline information, comments, discussions that may be relevant to the various project participants. The records in data repository 100 may be indexed with predefined search keys, e.g., keywords and subjects, to facilitate more efficient searching. Using indices 150, a user may conduct a keyword search for a particular keyword, such as "pistons," or a particular subject, such as "transmission fluid viscosity," and be furnished by server computer 120 with a list containing record references to the records that exactly or approximately satisfy the search criteria (records 106 and 108 respectively in this case). With the list of record references, the user may begin to review the actual contents of the records in the list to pinpoint the exact record needed.

Although the use of indices significantly improves the user's access to the records of data repository 100, there are disadvantages in the prior art's index searching technique when a computer network is involved. Consider, for example, the case whereby a user 130 wishes to search for records that have the term "piston" in their keyword field. To begin the search, user 130 at client computer 126 first requests a search form from server computer 120. The search form includes a keyword field into which user 130 may enter the term "piston." Client computer 126 then transmits the search form with the query to server computer 120. Using the supplied query, which is "piston" in the keyword field in this case, server computer 120 then searches through indices 150 for the records that satisfy this query. The result of the index search is then transmitted by server computer 120 to client computer 126 in the form of a list of record references. In this example, the list of record references contains record IDs for records 106, 110, 112, and 104 although a typical broad search like the above typically turns up many more records.

Upon receiving the search result, client computer 126 displays the search result to user 130. If too many records are returned in the list of record references or if the titles (or abstracts or whatever descriptive information supplied with each record in the list of record references) suggest that the search needs further refinement, user 130 may refine the search by, for example, entering more detailed keywords (e.g., "piston weight") or use Boolean operators (e.g., keyword="piston" and "specification" and subject="piston machining"), or specify a new search altogether using new keywords and/or different search keys. Again, client computer 126 sends the search form with the new query to server computer 120 to allow server computer 120 to obtain a new list of record references from indices 150 and to transmit the new search result to the user. The user may conduct many such index searches before a satisfactory search result is obtained.

At some point, user 130 selects one or more of the records presented in the list of record references for download. Client computer 126 sends the selection to server computer 120, which obtains the appropriate record or records from data repository 100 for download into client computer 126 via server computer 120.

As can be appreciated from the example above, virtually every operation desired by the user results in a request from his client computer to server computer 120 for action. By way of example, every search by user 130 results in a new query form being sent to server computer 120 to allow server computer 120 to search through indices 150 for the records that satisfy the search query. Further, the requirement that server computer 120 performs every search for every client computer creates a processing bandwidth bottleneck at server computer 120.

The processing bandwidth bottleneck may be partially alleviated by increasing the processing and/or storage capacity of server computer 120 to allow it to perform searches faster. However, even if server computer 120 could instantaneously perform the searches requested by the users of the computer network, there may still be a significant amount of time latency between the time a user enters a search query and the time the user obtains the search result. This is because there is typically a non-trivial amount of time delay associated with transmitting the query from the client computers to server computer 120, and with transmitting the index search result from server computer 120 back to the client computers.

To a certain degree, this delay may be reduced by employing faster and more expensive networking technology, which increases the speed of data transmission between the client computers and server computer 120. As computer networks become more global, however, some time latency still exists, particularly as the geographic distance between the server computer and the client computer is substantial. Further, data transmission may take place over public telecommunication networks, whose transmission speed and delay are beyond the control of the individual enterprises (e.g., the automobile company in the previous example) that are connected to the public telecommunication networks. Because of this, no amount of internal upgrading of data communication equipment would alleviate the delays associated with index searching, as it is currently implemented.

In view of the foregoing, there are desired improved techniques for performing index searches in computer networks.

SUMMARY OF THE INVENTION

The invention relates, in accordance with one aspect of the present invention, to techniques for reducing the time latencies due to network delays, cross-platform translations of queries and search results, and/or the processing bottleneck at the server processor that are associated with index searching. In accordance with one aspect of the present invention, the indices, or portions thereof, be stored, or cached, locally at the client computers that are involved in index searching. When a user wishes to conduct an index search, the client computer first searches through the locally cached indices (i.e., the client indices) at the client computer to obtain a search result locally. Since the index searches are performed with the locally cached client indices, the time delays due to network latencies, cross-platform translations, and/or server processing bandwidth bottleneck are substantially reduced.

Since local indexing may require a plurality of commands to be transmitted between the client computer and the server computer, the invention provides, in accordance with one aspect, a technique for allowing commands related to local index searching to traverse the security firewalls whereby the commands are encapsulated in the payload of data packets whose protocol has already been deemed innocuous or acceptable to the security firewalls. Once the commands pass through the security firewalls, they may be reassembled on the other side from the payloads of the data packets and employed to facilitate local index searching.

These and other advantages of the present invention will become apparent upon reading the following detailed descriptions and studying the various drawings.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to avoid unnecessarily obscuring the present invention.

In accordance with one aspect of the present invention, it has been observed that users typically employ the indices of a data repository in a manner that greatly exacerbates the time latencies associated with the prior art index search techniques. It has been observed that a typical user wishing to locate some particular record typically does so by conducting in series a multiplicity of index searches using different queries, each different from others in term of the query content and/or in term of scope. To elaborate, the typical user tends to begin searching by specifying a fairly broad search query to ascertain whether the data repository has any information on the topic at hand. Once this initial broad search is accomplished, the user may subsequently perform multiple index searches to progressively narrow the list of record references down to those deemed by the user to be most likely to contain the information sought and/or most relevant to the topic. Once the search result appears satisfactory, the user may then select some or all of the records referenced in the result and download their contents into his client computer for operation.

It is also realized by the inventors herein that the prior art approach to index searching greatly increases the total amount of time it takes for a user to find information. This is because every index search in the prior art involves a network delay. The network delay is present since the prior art requires that every index search query be transmitted through the network to the server computer, and every search result be transmitted back through the network to the client computer for display.

If the server computer and the client computer are implemented on different platforms, as is often the case in modem computer networks, the prior art index search technique also introduces additional time delay beyond network latency. This additional time delay exists since every search query from the client computer may need to be translated, or converted, to a format understandable by the server computer, and every search result obtained by the server computer may need to be translated to a format that can be displayed by the client computer. Still further, when multiple client computers submit their index search requests substantially simultaneously, a processing bandwidth bottleneck exists at the server, thus introducing yet additional time delays as the server computer services these multiple index search requests in turn. These time delays are cumulative over the many index searches conducted, thereby lengthening the time it takes to locate information, contributing to user dissatisfaction and/or reducing the usability of the data repository.

In accordance with one aspect of the present invention, it is advantageously realized that the time latencies due to network delays, cross-platform translations of queries and search results, and/or the processing bottleneck at the server processor, may all be substantially reduced by allowing index searching to take place locally at the client computer. It is also realized that recent advances in technology have made it feasible, and in fact have made it common, for a client computer to have sufficient processing and/or storage resources to handle index searching locally. Further, it is realized that although the entire data repository may be too large to be efficiently transmitted to the client computers and stored locally at each client computer, the indices therefor are typically much smaller and typically can easily be transmitted to the client computers and stored locally thereat.

With these realizations, it is proposed that the indices, or portions thereof, be stored, or cached, locally at the client computers that are involved in index searching. Thus, when a user wishes to conduct an index search, the client computer first searches through the locally cached indices (i.e., the client indices) at the client computer to obtain a search result locally. Since the index searches are performed with the locally cached client indices, the time delays due to network latencies, cross-platform translations, and/or server processing bandwidth bottleneck are substantially reduced.

To facilitate local index searching, the client computers and the server computer work cooperatively to establish and/or maintain the client indices. This is because the server computer needs to stay involved to supply the client computers with the indices, to update the indices at the client computers as time goes by, or the like. This level of cooperation requires a multiplicity of commands to be transmitted between the client computers and the server computer.

In accordance with another aspect of the present invention, it is realized that existing security firewalls may prevent the transmission of commands between the client computers and the server computer in a typical computer network. Existing security firewalls are typically designed to prevent damages to the server computer and/or client computer data by, for example, intercepting instructions or commands deemed capable of causing destructive changes in the databases within the server computer and/or the client computers. Since existing firewall programs are not created with the inventive index searching technique in mind, the very commands needed to locally cache the indices, to update them as time goes by, or the like, may not be able to traverse the security firewalls to reach the server computer and/or the client computers.

The invention provides, in accordance with one aspect, a technique for allowing commands related to local index searching to traverse the security firewalls whereby the commands are encapsulated in the payload of data packets whose protocol has already been deemed innocuous or acceptable to the security firewalls. Once the commands pass through the security firewalls, they may be reassembled on the other side from the payloads of the data packets and employed to facilitate local index searching.

Figure 2:
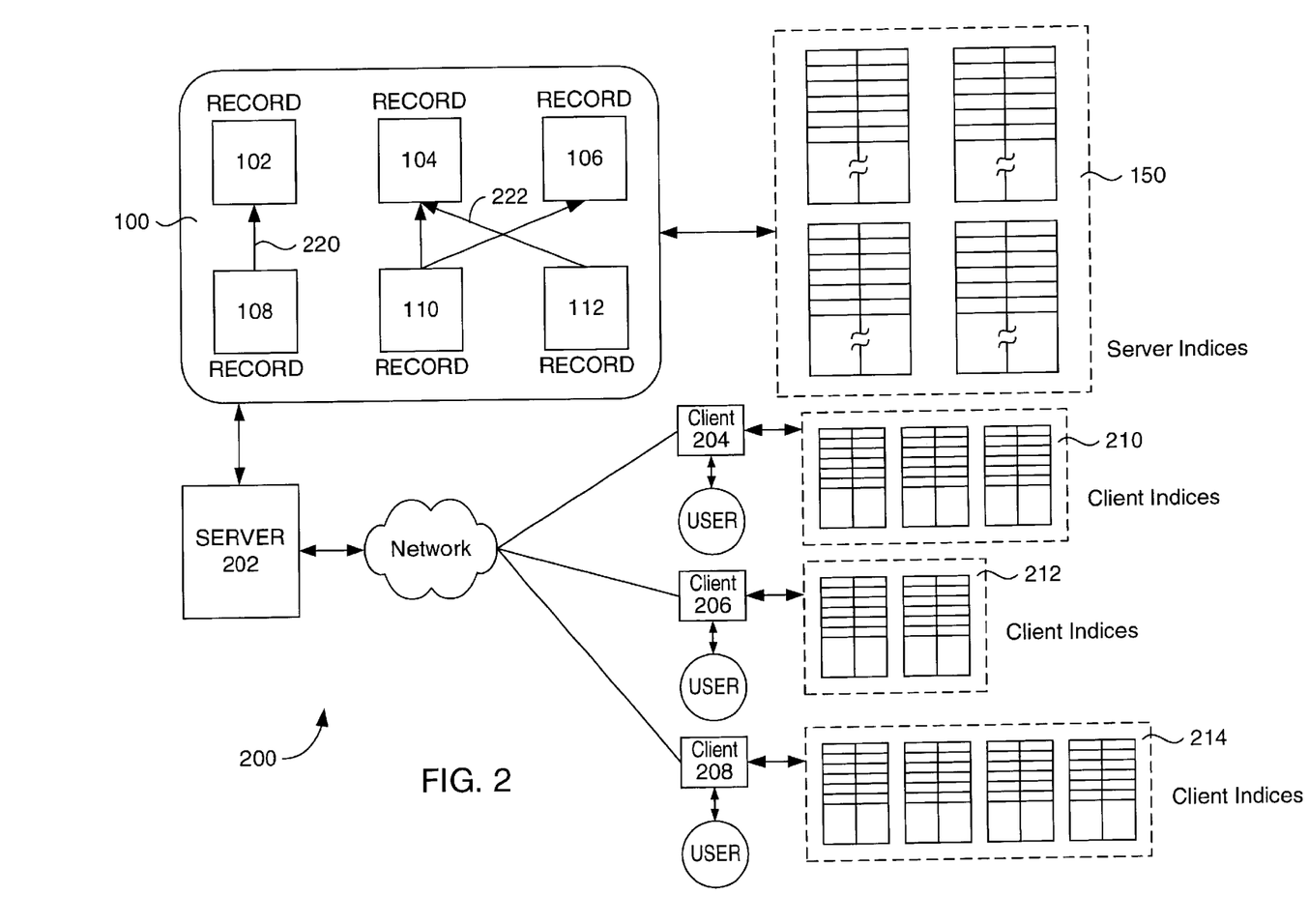
FIG. 2 illustrates, in accordance with one embodiment of the present invention, an arrangement for allowing users in a computer network to perform index searches locally at client computers for records stored in the server data repository.

To facilitate discussion of the advantages and features of the present invention, FIG. 2 depicts, in accordance with one embodiment of the present invention, a simplified diagram of a computer network 200 including a server computer 202 and client computers 204, 206 and 208. As with the case of FIG. 1, although only one server computer and three client computers are depicted in FIG. 2 to simplify the discussion, a typical computer network may include any number of server computers and client computers.

A server data repository 100, which is associated with server computer 202, is substantially identical to the data repository of FIG. 1 and includes the same records 102–112 as shown. Server indices 150, which is associated with server data repository 100, represents indices of searchable fields and corresponding record references to the records within server data repository 100 to facilitate index searches by server computer 202. Both server data repository 100 and server indices 150 are accessible by server computer 202 for update, data retrieval, searches, and the like.

Each of client computers 204, 206 and 208 has an associated client index, which is received from server computer 202 to facilitate local index searching. These client indices are shown by reference numbers 210, 212, and 214 respectively in FIG. 2.

Client indices 210, 212, and 214 represent indices to the records within server data repository 100. Within client indices 210, 212 and 214, the records of server data repository 100 are indexed by their searchable fields, e.g., keywords and/or subject. Indices may be also created using record links as the search key. Links are typed data that indicates the relationship between a record and another record. Records may be in a formal, explicit relationship with other records. By way of example, the creator of record 108 may indicate explicitly upon its creation that record 108 is intended to be a comment to the content of record 102. In this case, an explicit link (depicted conceptually by reference number 220) is created between record 108 and record 102. A record may also be implicitly related to another record. By way of example, if a record 112 includes a function which employs as one of its arguments a value in record 104, record 112 is deemed to have an implicit reference to record 104 (depicted conceptually by reference number 222). Indexing by links allows a user to ascertain the existence and identify of records that are related to a given record by comment links (or cause-and-effect link, or time dependency link, or any other link type).

Figure 3:
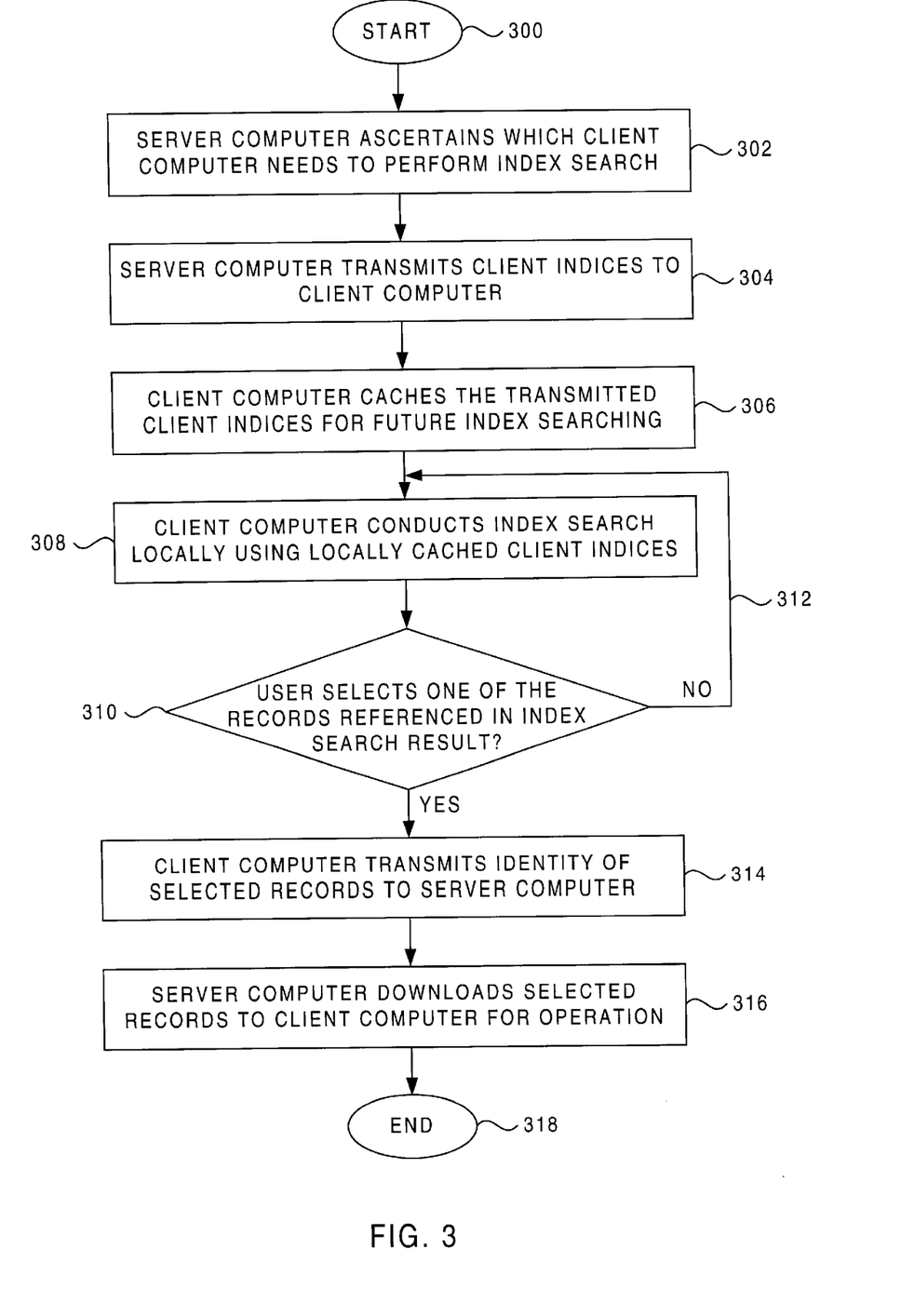
FIG. 3 is a simplified flow chart illustrating, in accordance with one embodiment of the present invention, the relevant steps involved in allowing a client computer to perform index searches through a locally cached client index.

In accordance with one aspect of the present invention, server computer 202 transmits the client indices to the client computers that wish to conduct index searches. The client computers receiving the client indices may then locally cache the received client indices locally to be used over and over at the client computer. FIG. 3 is a simplified flow chart illustrating the relevant steps involved in allowing a client computer to perform index searches through a locally cached client index. In general, the technique underlying these steps may be implemented in using any suitable programming methodology, including object-oriented programming. In step 302, the process begins by the server computer determining which client computer(s) need to have locally cached indices. In one embodiment, all client computers are furnished with client indices upon startup. More preferably, the client indices are transmitted from the server computer only to client computers that have expressed a desire to conduct index searching.

In step 304, the client indices are transmitted from the server computer to the client computer(s). In one embodiment, the client indices transmitted to the client computer to facilitate local index searching may be substantially identical to the server indices (i.e., a copy of the server indices). Alternatively, the transmitted client indices may represent indices that are prepared for use specifically by the client computer. This is typically the case if the client computer runs on a platform that is different from the platform associated the server computer and the server indices have been optimized for use on the server hardware platform.

Further, it is not necessary that the contents of the client indices and the server indices be identical. Further, it is not necessary that the contents of the client indices at different client computers be identical. By way of example, the user of a given client computer may have an account that has been authorized access to only a portion of server data repository 100. In this case, only references to records for which that user has authorized access will be referenced in the client indices to be transmitted to the client computer. In this manner, that user would not even know of the existence of the other records in server data repository 100 for which that user has no authorized access.

Alternatively, the client indices may include references to the restricted records to allow the user to be aware of the existence of the restricted records upon performing the index searching. The contents of the restricted records may still be kept confidential by denying that user download access. If that user has a legitimate need for the contents of the restricted records, petition may be made to the network administrator for download access.

Additionally or alternatively, the client indices may include only indexed records and/or search fields that are likely to be search by a particular user. By way of example, server computer 202 or a client computer (e.g., client computer 204) may statistically or heuristically (based on usage pattern, for example) determine that a particular user is likely to search only by subject and/or only within certain subsets of the records of server data repository 100. In this case, the client indices may exclude indices and/or record references deemed unlikely to be searched by that user, thereby keeping the amount of data that need to be transmitted from the server computer to that client computer small. If the user happens to conduct an index search that requires other indices and/or record references, the client computer may at that point request the full set of indices for local caching or may simply pass that particular index search query up to the server computer for handling.

In step 306, the transmitted client indices are stored, or cached, locally at the client computer. The client indices may be cached only for each session, or may be kept in a secure (e.g., password protected and/or encrypted) manner at the client computer so that retransmission of the client indices will be unnecessary in subsequent sessions. After caching, the client indices may be kept current using a variety of techniques. These techniques of updating the client indices will be discussed later herein.

Thereafter, the client computer may employ the locally cached client indices to perform index searches locally to obtain index search results (step 308). Through the loop comprising steps 308 and 310 and arrow 312, the user may perform as many index searches through the locally cached client indices as desired until the user finds the record or records for download. If the user selects one of the records referenced in the index search result for download (via step 310), the selected record references are then sent to the sever computer (step 314). The server computer then retrieves the selected records from the server data repository and downloads their contents to the client computer for operation. The downloading of the selected record(s) from the server data repository (e.g., server data repository 100) by the server computer (e.g., server computer 202) to the client computer (e.g., client computer 204) is shown in step 316.

As can be appreciated from the discussion associated with FIG. 3, once the indices are cached locally at the client computers, index searches performed by client computers may take place without substantial involvement by the server computer. In fact, no involvement by the server computer may be required until a download request for the record contents is received by the server computer. If the client indices are only a subset of the server indices, however, the user may be given the option to search through the server indices if desired. This would be the case if the search involves some fairly esoteric search keys such that, for efficiency reasons, the indices therefor did not get cached locally since they are infrequently used. Alternatively or additionally, the user may elect to perform a full search through the contents of the records to find the information needed. The ability to perform searches at multiple levels is a feature of the present invention.

As the content of server data repository 100 changes with user updates and additions, the server indices may be updated (by server computer 202), either automatically or upon user request, to reflect the changes. At some point in time, it may be desirable to also update the client indices to keep the client indices current. Updates of the client indices may take place automatically whenever the server data repository is changed. Alternatively or additionally, the client indices maybe updated periodically based on some predefined schedule and/or whenever the client computer initiates an index search.

More preferably, the client indices are updated only upon request by the user of the client computer. This is particularly advantageous in the situation where the user of the client computer performs progressively narrow searches through the client indices in order to pinpoint the record(s) of interest. In this situation, automatic updating of the client indices may cause the client indices to return different search results for the exact same query if another user at another client computer happens to update the server data repository in between searches. To avoid the appearance of logical inconsistency, control of index update timing may be given to the user. To remind the user of the need for index updating, a flag may be furnished to the user to inform the user that the server data repository has changed and that client index updating is suggested.

Figure 4:
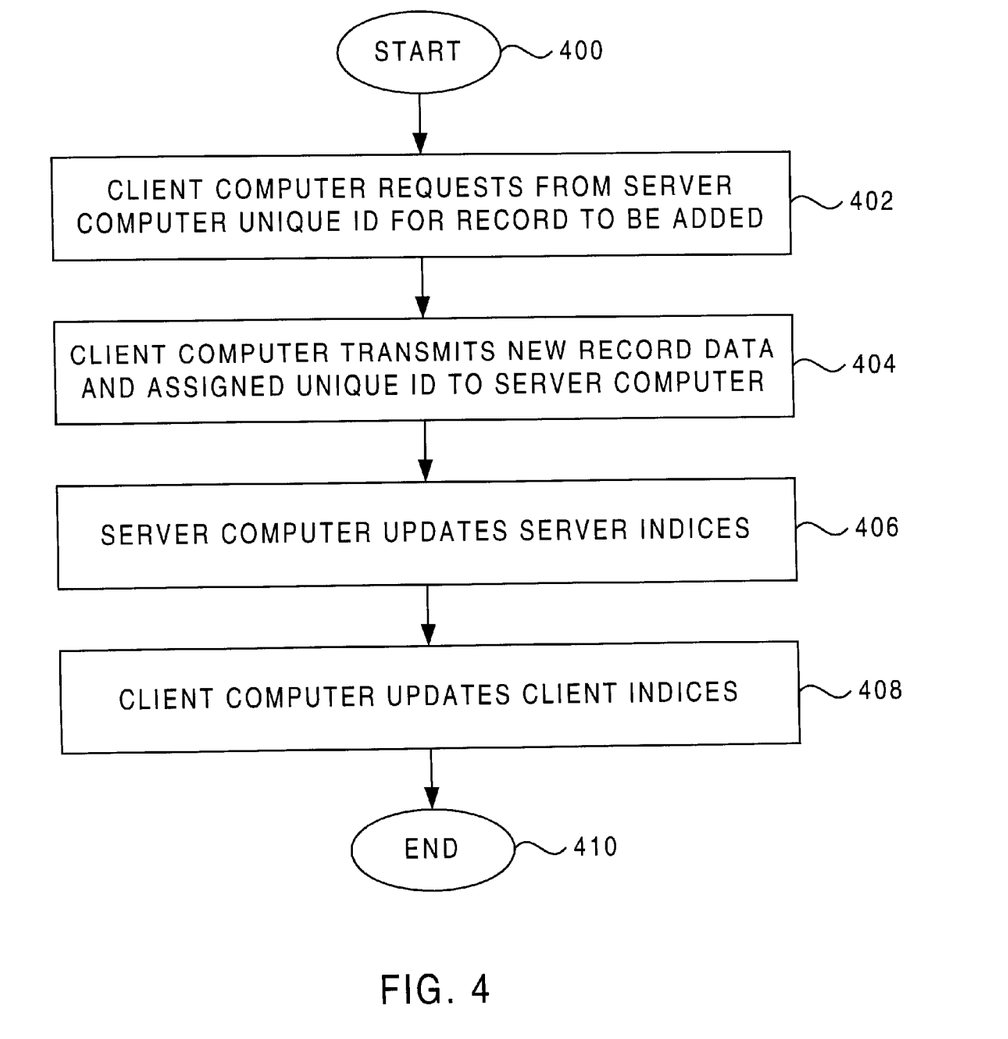
FIG. 4 is a flowchart illustrating, in accordance with one embodiment of the present invention, the relevant steps taken when a user wishes to add a record to the server data repository.

In addition to searching, users of client computers may also wish to add or make modifications to server data repository 100. FIG. 4 is a flowchart illustrating the relevant steps taken when a user wishes to add a record to the server data repository. In step 402, the client computer begins by acquiring a unique ID for the new record from the server computer. The unique ID serves to identify the record uniquely within data repository 100 and is typically assigned by server computer 202. Once the client computer receives the unique ID from the server computer, the client computer then transmits the record data along with the assigned unique ID to the server computer to be added to server data repository 100. The record data itself may be entered by the user or automatically through the use of data sensors. Once added (i.e., stored within the server data repository), the server indices may be changed to reflect the addition (step 406). In step 408, the client computer may also update its own client indices with the same record data and assigned unique ID that were transmitted to the server computer in step 404. (Note that step 408 may be performed at any time after the record data and unique ID are ascertained). Immediate updating of the client indices for this user is preferable, although not absolutely required, to keep the indices logically consistent with the user's understanding that the new record has been added to the server data repository and may be searched. Note that although the discussion above deals with record addition, analogous operations may be undertaken to update an existing record (except that a new unique ID is not required).

Since the client computers and the server computer now work collaboratively to create the client indices from the server data repository and/or from the server indices, to update the client indices over time, and the like, commands need to be transmitted back and forth between the client computers and the server computer. Within a proprietary, closed computer network, these computer commands typically do not present difficult implementation problems. Over public telecommunication networks such as the Internet, however, the transmission of commands which fundamentally operate on the databases residing at the client computers and the server computer create special challenges. This is because the server computer and/or the client computers are typically shielded from the public communication networks by security firewalls, and these security firewalls are typically programmed to look for and screen out executable commands that are unrecognized and/or suspect, such as those fundamentally modifying the databases at the client and/or server computers.

Figure 5:
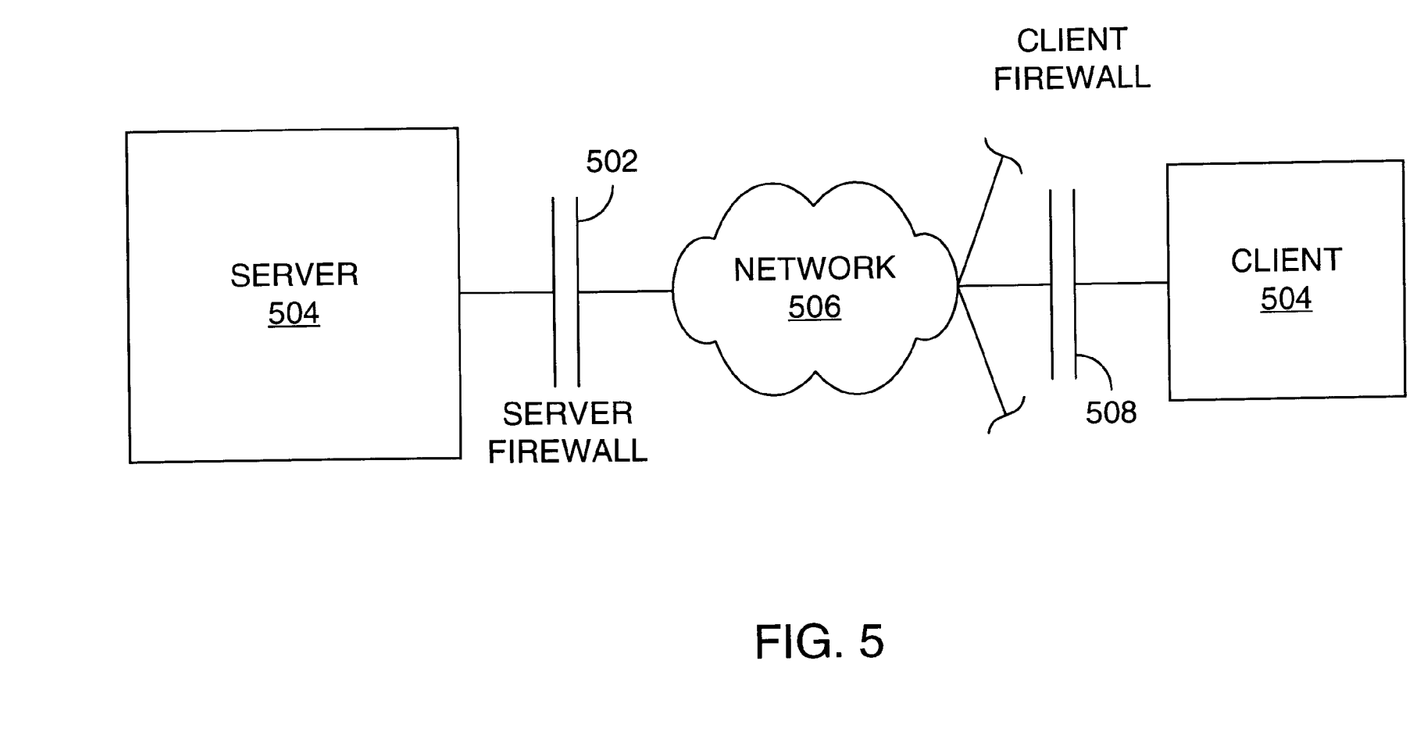
FIG. 5 depicts an exemplary computer network that includes security firewalls to facilitate discussion.

With reference to FIG. 5, for example, a server firewall 502 is shown disposed between server computer 504 and public network 506 for security purposes. As is well known in the art, server firewall 502 typically monitors the data sent to server 504 and permits only certain types of data deemed to be safe or acceptable to pass through. Likewise, a client computer firewall 508 is shown disposed between client computer 504 and public network 506 to protect client computer 504. Since the commands transmitted between the client computers and the server computer to facilitate the creation and/or update of the client indices are typically not recognized by existing security firewall programs, these commands may be screened out, i.e., not permitted to pass through.

In accordance with a particularly advantageous embodiment of the present invention, the commands associated with the creation and/or maintenance of the client indices are advantageously transported across the firewalls (e.g., server firewall 502 and/or client computer firewall 508) by encapsulating the commands within the payloads of data packets whose protocol are deemed acceptable to the server firewalls. By way of example, Internet traffic between an Internet browser on the client computers and an Internet server is typically transported using the HTTP protocol. The HTTP protocol is a well known protocol in which data are transmitted in the payloads of data packets, each of which also includes an HTTP header and an HTTP trailer in addition to the payload. The HTTP protocol is acceptable to the server and/or client firewalls since they carry mostly HTML (Hypertext Markup Language) data and commands, and most security firewalls have been designed to let HTTP data packets pass through. Additionally, using HTTP packets to transport the commands between the client computers and the server computer advantageously leverages the advances that have been made in the transmission of HTTP packets.

By encapsulating the commands related to client indices creation and/or updating in the payloads of HTTP data packets, the invention advantageously allows these commands to be transported across the server firewall and/or the client computer firewall without requiring modification to the existing firewall software. It should be borne in mind, however, that although the HTTP protocol is discussed herein as an example, other protocols may also be employed to transport the commands across the security firewalls. As long a given protocol is acceptable to the firewall software, the packaging of the commands in the payload of the data packet would allow the commands to be transported across the firewall without requiring a substantial rewriting of the firewall software. The selection of a specific protocol is network-specific and is within the skills of one knowledgeable in the networking art given this disclosure.

Although the inventive local index caching technique and/or protocol packaging technique can be advantageously applied to all record-based databases implemented in a computer network, they are particularly advantageous when employed in electronic notebook and collaborative software, particularly trackpoint-based collaborative project development and communication programs, which are designed to help project participants work efficiently together on a project to collaborate and to communicate efficiently. In such a program, data related to the project are stored in a plurality of trackpoints (or records) in a server data repository and indexed in server indices. The present invention may be readily employed to facilitate the creation and maintenance of the client indices so that index searches for the trackpoints/records can be accomplished using the locally cached client indices. Trackpoints and an exemplary implementation of the trackpoint-based collaborative project development and communication program has been discussed in detail in the aforementioned commonly owned, co-pending U.S. and PCT patent entitled "Trackpoint-Based Computer-Implemented Systems And Methods For Facilitating Collaborative Project Development And Communication," and will not be discussed further here for brevity's sake.

Electronic notebooks are another area where local index caching and protocol packaging techniques can be applied effectively. An electronic notebook is an electronic metaphor for the collaborative environment whereby trackable events (deadlines, notes, quantity, quality, and the like) pertaining to a project may be stored in data structures and presented to the project participants as if they are reviewing a notebook. Thus, an electronic notebook is an informal, collaborative environment that allows geographically-distributed teams to efficiently share information across both time and space. The electronic notebook depends on the local index caching techniques for performing fast, efficient searches on locally cached metadata. Protocol packaging (as will be described below) techniques may also be used extensively for establishing a connection to a notebook, for browsing information in the notebook, and for adding new records to the notebook.

Figure 6:
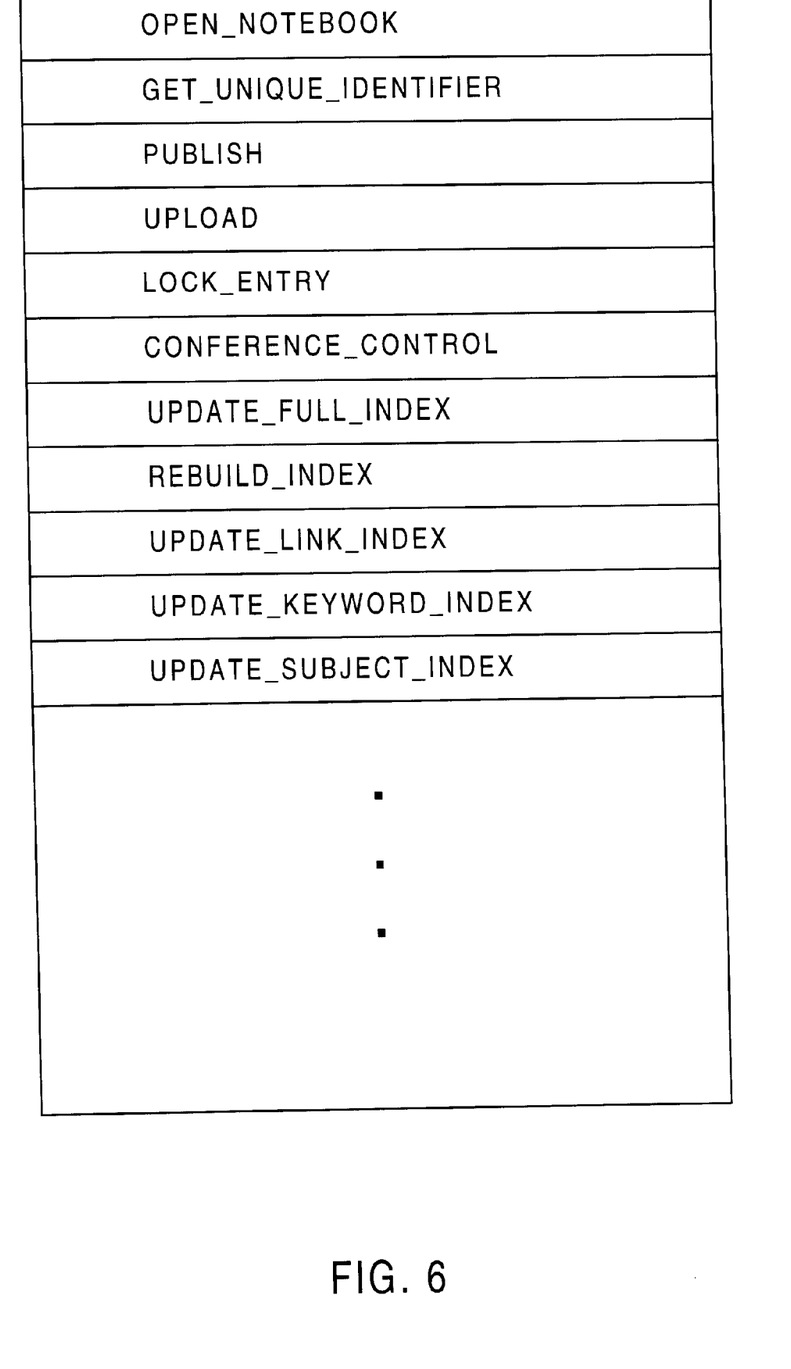
FIG. 6 is a table showing some commands that a client computer may transmit to the server computer in accordance with one aspect of the present invention.

In general, the client computer may transmit a variety of commands to the server computer to access the server data repository and/or the server index, to create and/or maintain the client indices, and/or to facilitate local index searching. FIG. 6 is a table showing some commands that a client computer may transmit to the server computer in accordance with one aspect of the present invention. It should be noted that the commands illustrated in FIG. 6 are only exemplary and the number of types of commands that may be implemented may vary depending on the needs of the application program and/or the underlying record-based data repository. Also, although these commands have specific names, the naming is arbitrary and should in no way be limiting of the underlying functions.

It should also be noted that since the commands are packaged within the payload of protocol packets as data, the set of commands that may be implemented is not constrained by those already furnished with an existing program/language (such as HTML) and is virtually unlimited. For the same reasons, each command may be customized with any command option and/or argument that may be needed. By way of example, some of these options may furnish the server computer with information to clarify the command issued (e.g., whether the record sent from the client computer is a new record or an updated version of an existing record), information pertaining to the content of the record sent, information on how to index a record, information about links, or the like. In fact, the flexibility and freedom with which one can create and/or customize the command set is one advantage of the present invention.

With reference to FIG. 6, the client computer may issue an OPEN_NOTEBOOK command to signify that the client wishes to access the server data repository for searches. The OPEN_NOTEBOOK command may be issued with any number of command options, arguments, and/or filter to customize the size and content of the client indices. By way of example, the user may specify that only certain indices, or only records fitting certain criteria, should be included in the client indices in order to reduce the size of the client indices downloaded to the client computer initially. In response to the OPEN_NOTEBOOK command, the server computer may then create the client indices for transmission to the client computer that issues the OPEN_NOTEBOOK command. The GET_UNIQUE_IDENTIFIER command instructs the server computer to furnish a unique identifier for the record created by the client computer.

The client computer may issue a PUBLISH command to request the server computer to store in the server data repository the record associated with this command and also update the server indices. The UPLOAD command requests that the server stores the record that is associated with the command without updating the server indices right away. This command may be issued if there are multiple consecutive uploads and it may be more efficient to complete the multiplicity of uploads before updating the server indices. For both the PUBLISH and the UPLOAD commands, options may be included to distinguish between an update and a new record in order to assist the server computer in its storage and/or updating tasks.

The LOCK_ENTRY command may be issued by a client computer to indicate to the server computer that the record associated with this command should be locked against modification in the future (with options specifying the type of modification prohibited and/or the users affected). The CONFERENCE_CONTROL command may be issued by a client computer to indicate that it is currently working with one of the records and other client computers working with the same record should be excluded from accessing thereto simultaneously.

The UPDATE_FULL_INDEX command instructs the server computer to update all server indices. This instruction may be issued after the issuance of an UPLOAD command to ensure that the server indices are properly updated with the new or updated records. The REBUILD INDEX command, on the other hand, instructs the server to rebuild all server indices from raw data in the server data repository. The REBUILD_INDEX command may be issued whenever the integrity of the server indices is in question (e.g., after some portions of the indices have been discovered to be corrupted). The UPDATE_LINK_INDEX, UPDATE_KEYWORD_INDEX, AND UPDATE_SUBJECT_INDEX may be issued to request the server to update individual indices instead of all the indices (as in the case with the UPDATE_FULL_INDEX command). Note that variations of these update and rebuild index commands may also be issued by the client computer to accomplish updating of the client indices.

Figure 7:
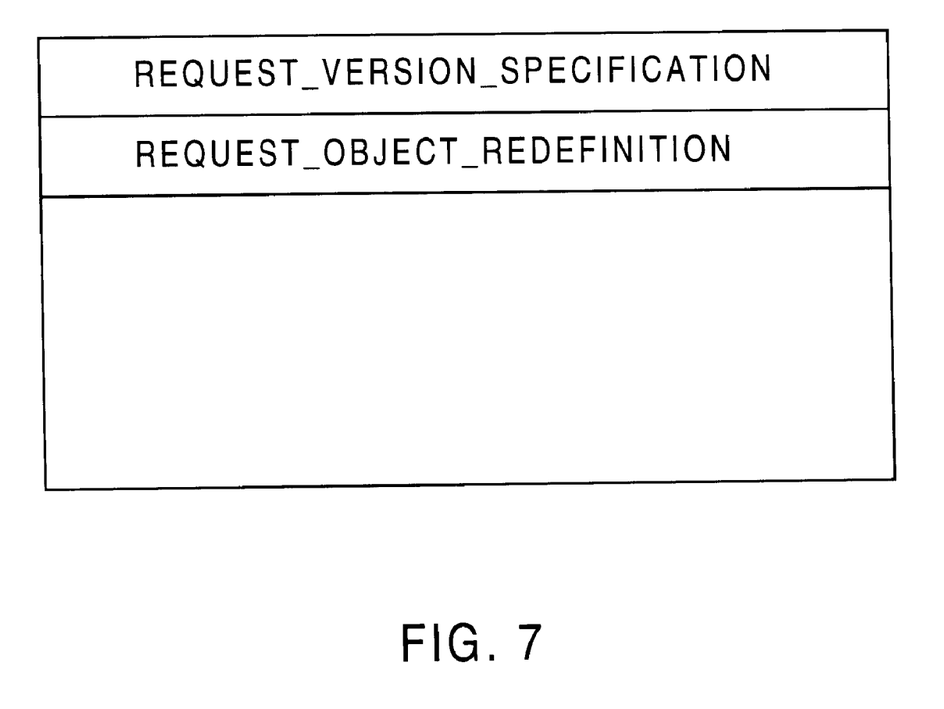
FIG. 7 is a table showing some commands that a server computer may transmit to the client computer in accordance with one aspect of the present invention.

The server computer may also transmit any number of commands to the client computer to facilitate index searching in accordance with principles of the present invention. FIG. 7 illustrates some of the exemplary commands that may be transmitted from the server computer to the client computer to facilitate index searching and data retrieval. By way of example, the server computer may be aware that a particular record may have multiple versions (to facilitate tracking the history of changes, for example). If the user request a particular record, the server computer may issue a REQUEST_VERSION_SPECIFICATION command with which the server computer may present the versions available and ask the user to clarify which version is needed. As another example, the server computer may issue a REQUEST_OBJECT_REDEFINITION command with which the server computer informs the client computer that definition of the associated record (e.g., one of the functions or arguments in the record) is logically unsound and needs to be corrected. This may happens when, for example, a function in the associated record references an attribute of a nonexistent record. It should be again be noted that the commands illustrated in FIG. 7 are only exemplary and the number of types of commands that may be implemented may vary depending on the needs of the application program and the underlying record-based data repository.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a client-server computer network, a computer-implemented method for facilitating index searching by a client computer through records of a datastore, said datastore being accessible by a server computer of said client-server computer network, comprising:

creating client indices of said records, said client indices being in a format accessible by said client computer, wherein said creating said client indices includes transmitting a command from said client computer to said server computer to instruct said server computer to create said client indices, said transmitting said command includes encapsulating said command that instructs said server computer to create said client indices in a payload of at least one data packet, said at least one data packet being chosen to have a protocol that can traverse to a security firewall between said client computer and said server computer; and transmitting said at least one data packet from said client computer to said server computer through said security firewall;

transmitting said indices to said client computer;

storing said client indices locally at said client computer; and employing said client indices for said index searching by said client computer to produce a list of records that satisfies a search query associated with said index searching.

2. The computer-implemented method of claim 1, wherein the encapsulation of said command encapsulates the command using HTTP protocol.

3. In a client-server computer network, a computer-implemented method for facilitating index searching by a client computer through records of a datastore, said datastore being accessible by a server computer of said client-server computer network, comprising:

creating client indices of said records, said client indices being in a format accessible by said client computer;

transmitting said indices to said client computer;

storing said client indices locally at said client computer;

employing said client indices for said index searching by said client computer to produce a list of records that satisfies a search query associated with said index searching;

selecting one record of the list of records that satisfies the search query;

transmitting the selected one record from the server to the client;

creating second client indices of said records, said second client indices being in a format accessible by a second client computer, wherein the second client indices are less than the client indices; and determining records most likely to be searched on the second client computer so that the second client indices are created according to the determined records most likely to be searched on the second client computer.

4. In a client-server computer network, a computer implemented method for facilitating index searching by a client computer through records of a datastore, said datastore being accessible by a server computer of said client-server computer network, comprising:

creating client indices of said records, said client indices being in a format accessible by said client computer;

transmitting said indices to said client computer;

storing said client indices locally at said client computer; and employing said client indices for said index searching by said client computer to produce a list of records that satisfies a search query associated with said index searching;

selecting one record of the list of records that satisfies the search query;

transmitting the selected one record from the server to the client;

creating second client indices of said records, said second client indices being in a format accessible by a second client computer, wherein the second client indices are less than the client indices;

performing a search on the second client computer that is beyond the second client indices; and submitting the search to the server.

5. In a client-server computer network, a computer-implemented method for facilitating index searching by a client computer through records of a datastore, said datastore being accessible by a server computer of said client-server computer network, comprising:

creating client indices of said records, said client indices being in a format accessible by said client computer;

transmitting said indices to said client computer;

storing said client indices locally at said client computer;

employing said client indices for said index searching by said client computer to produce a list of records that satisfies a search query associated with said index searching;

selecting one record of the list of records that satisfies the search query;

transmitting the selected one record from the server to the client;

creating server indices, wherein the client indices are a subset of the server indices; and removing parts of the server indices according to a security level of the client in the creating of the client indices.

6. A computer-implemented arrangement for searching a plurality of records, comprising:

a server, wherein the server comprises:
a database of the plurality of records; and
server indices of the database of the plurality of records;

a client, wherein the client comprises:
client indices of the database of the plurality of records; and
a search tool for using the client indices; and a network which connects the server and the client together in a client-server network, wherein the network comprises a firewall between the client and the server, and wherein the client comprises a command encapsulator, which encapsulates commands from the client to the server regarding the creating of client indices.

7. The computer-implemented arrangement, as recited in claim 6, wherein the command encapsulator encapsulates the commands with an HTTP protocol.

8. A computer-implemented arrangement for searching a plurality of records, comprising:

a server, wherein the server comprises:
a database of the plurality of records; and
server indices of the database of the plurality of records;

a client, wherein the client comprises:
client indices of the database of the plurality of records; and
a search tool for using the client indices;

a network which connects the server and the client together in a client-server network; and a second client connected to the network, wherein the second client comprises:
second client indices which are smaller than the client indices; and
a search tool for using the second client indices, wherein the second client indices are a subset of the server indices and are dependent on records most likely to be searched on the second client.

* * * * *